US011028833B2

(12) United States Patent
Markussen (10) Patent No.: US 11,028,833 B2
(45) Date of Patent: Jun. 8, 2021

(54) ROTOR LOCK SYSTEM FOR A WIND TURBINE

(71) Applicant: Vestas Wind Systems A/S, Aarhus N. (DK)

(72) Inventor: Erik Markussen, Videbæk (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/332,012

(22) PCT Filed: Sep. 28, 2017

(86) PCT No.: PCT/DK2017/050315
§ 371 (c)(1),
(2) Date: Mar. 11, 2019

(87) PCT Pub. No.: WO2018/065018
PCT Pub. Date: Apr. 12, 2018

(65) Prior Publication Data
US 2019/0219034 A1    Jul. 18, 2019

(30) Foreign Application Priority Data
Oct. 7, 2016   (DK) ............................ PA 2016 70790

(51) Int. Cl.
*F03D 80/50*     (2016.01)
*F03D 13/10*     (2016.01)
*F03D 7/02*      (2006.01)

(52) U.S. Cl.
CPC ........... *F03D 80/50* (2016.05); *F03D 7/0268* (2013.01); *F03D 13/10* (2016.05); *F05B 2260/30* (2013.01); *Y02E 10/72* (2013.01)

(58) Field of Classification Search
CPC .... F03D 7/0248; F03D 7/0244; F03D 7/0268; F03D 80/50; F03D 13/10;
(Continued)

(56) References Cited

U.S. PATENT DOCUMENTS 8,646,177 B2 * 2/2014 Tirumalai ............. F03D 1/0658
29/23.51
8,710,693 B2 * 4/2014 Amano .................. F03D 9/17
290/55
(Continued)

FOREIGN PATENT DOCUMENTS

CN      202370759 U    8/2012
CN      205330887 U    6/2016
(Continued)

OTHER PUBLICATIONS

Danish Patent and Trademark Office, Search and Exam Report in PA 2016 70790, dated Apr. 4, 2017.
(Continued)

*Primary Examiner* — Woody A Lee, Jr.
*Assistant Examiner* — Maxime M Adjagbe
(74) *Attorney, Agent, or Firm* — Wood Herron & Evans LLP (57) ABSTRACT

A rotor lock system (20) for securing a main shaft assembly of a wind turbine (2) in a substantially stationary position, the main shaft assembly comprising a main rotor shaft (16) supported by a base frame (14), and the rotor lock system comprising: a locking disk (22), associated with the main rotor shaft (16), and provided with a plurality of locking apertures (26); and a locking unit (24) comprising a first end (28) arranged to engage with the locking disk (22), and a second end supported by a mounting feature (38) associated with the base frame (14), wherein the locking unit (24) is configured to be adjustable relative to the mounting feature (38) so that the first end (28) moves linearly with respect to the mounting feature.

20 Claims, 4 Drawing Sheets

(58) Field of Classification Search
CPC .......... F05B 2260/301; F05B 2260/902; F05B 2260/30; Y10T 403/29; Y10T 403/291; Y10T 403/293; Y10T 403/195; Y10T 403/299
USPC ................................ 248/637, 646, 656, 674
See application file for complete search history.

(56) References Cited

U.S. PATENT DOCUMENTS

| | | |
|---|---|---|
| 2012/0133147 A1 | 5/2012 | Numajiri |
| 2012/0137481 A1* | 6/2012 | Lindberg ................ F03D 13/10 29/23.51 |
| 2012/0181792 A1* | 7/2012 | Rettersen ................ F03D 80/00 290/55 |
| 2014/0322018 A1 | 10/2014 | Fritzsche et al. |

FOREIGN PATENT DOCUMENTS

| | | |
|---|---|---|
| DE | 102007058746 A1 | 12/2008 |
| DE | 102014208468 A1 | 11/2015 |
| EP | 1167755 A2 | 1/2002 |
| EP | 1659286 A1 | 5/2006 |
| KR | 101346178 B1 | 12/2013 |
| KR | 20140072561 A | 6/2014 |
| WO | 2010103086 A2 | 9/2010 |

OTHER PUBLICATIONS

European Patent Office, International Search Report and Written Opinion in PCT Application No. PCT/DK2017/050315, dated Dec. 15, 2017.

* cited by examiner

ROTOR LOCK SYSTEM FOR A WIND TURBINE

TECHNICAL FIELD

Aspects of the present invention relate to locking systems for wind turbines, and more particularly to systems for selectively locking a main shaft of a wind turbine in a fixed rotational position.

BACKGROUND

Due to the growing need for renewable energy production, wind turbines and their constituent components are being designed with increasing size and weight. As blade length increases, so does the torque that the blades exert on the main rotor shaft. It is therefore important to ensure that the rotatable components of the wind turbine (in particular, the main rotor shaft, hub and rotor blades) are maintained at a complete standstill during installation of these components, to avoid any potential injuries or damage to service personnel or maintenance equipment.

This is usually achieved by the implementation of a rotor lock, which in some cases may take the form of a rotor locking disk that is provided on or around the main rotor shaft, in fairly close proximity to the hub and rotor blades. When in use, the rotor locking disk is engaged to secure the main rotor shaft in a particular position, so as to prevent any further rotational movement of the main rotor shaft and its connected components.

When designing rotor lock mechanisms, it is also an important consideration to ensure that the rotor locking mechanisms are configured to counteract and withstand the large amounts of torque generated by the rotating components.

WO2010/103086A2 discloses an arrangement for mounting blades to a rotor hub of a wind turbine in which a brake disc in connection with the rotor hub can be held in a desired position by a locking device. The locking device is pivotally arranged around a fixed position on one side of the brake disc and on the other side, also pivotally arranged around a fixed position, a means for rotation of the brake disc is arranged in the form of a hydraulic cylinder.

It is against this background that the embodiments of the invention have been devised.

SUMMARY OF THE INVENTION

According to an embodiment of the present invention, there is provided a rotor lock system for securing a main shaft assembly of a wind turbine in a substantially stationary position. The main shaft assembly comprise a main rotor shaft supported by a base frame, and the rotor lock system comprises a locking disk, associated with the main rotor shaft, and provided with a plurality of locking apertures. The rotor lock system further comprises a locking unit comprising a first end arranged to engage with one or more of said plurality of locking apertures so as to retain the locking disk, and a second end supported by a mounting feature associated with the base frame, wherein the locking unit is configured to be adjustable relative to the mounting feature so that the first end moves linearly with respect to the mounting feature.

In particular, a portion of the locking unit is intended to engage with one or more of the locking apertures so as to retain the locking disk securely in a particular position. Advantageously, the ability to adjust the locking unit linearly relative to the mounting feature (and hence relative to the locking disk) thereby enables the portion of the locking unit that is intended to engage with the locking aperture(s) to be easily moved into the required position. This ensures secure engagement between the locking unit and the locking disk, and prevents further substantial rotation of the main rotor shaft. The primarily linear movement of the locking unit improves the ease with which the locking unit may be adjusted, and provides a particular benefit in the case of large wind turbines, in which the locking units themselves would be very heavy and not movable by maintenance personnel. The linear movement also obviates the need for a complex automatically actuated system which would normally be required for rotationally-movable or pivotable locking units.

Optionally, the first end of the locking unit comprises a retaining member for retaining at least a portion of the locking disk. In some cases, the retaining member may comprise one or more arms located adjacent to the locking disk. Advantageously, the use of a retaining member increases the security of engagement between the locking unit and the locking disk, and in particular, where the retaining member comprises arms, these may be configured to guide the positioning of the locking disk relative to the locking unit, so as ensure secure engagement between the two components.

In one example, the retaining member may comprise a pair of arms arranged to embrace a portion of the locking disk. Advantageously, this configuration helps to minimise lateral movement of the locking disk within the retaining member, as well as preventing further rotational movement of the locking disk.

Optionally, the locking unit further comprises a locking member moveable relative to the retaining member so as to releasably lock the locking disk into a fixed position. Advantageously, the use of a locking member allows the locking unit to easily engage and disengage with the locking disk, whilst ensuring that, when in use, the locking unit is brought into secure engagement with the locking disk.

The retaining member may be provided with one or more horizontally-penetrating retaining apertures, and the locking member is configured to engage with the retaining apertures and at least one of the plurality of locking apertures in the locking disk. In this configuration, the retaining apertures and the locking apertures may be brought into alignment with one another, and a portion of the locking member may be inserted through both sets of apertures. This advantageously increases the security of engagement between the locking unit and the locking disk.

The second end of the locking unit may comprise a stanchion configured to be mounted to the mounting feature. In some cases, the stanchion may comprise an adjustment mechanism arranged to enable the stanchion to be moved along a linear axis with respect to the mounting feature. The presence of an adjustment mechanism on the stanchion of the locking unit improves the ease of adjustment of the locking unit by a user.

Optionally, the adjustment mechanism comprises at least one rotatable element, and the adjustment mechanism is arranged to convert rotational movement of the at least one rotatable element to axial movement of the locking unit. In some cases, the at least one rotatable element comprises a collar movable along a threaded portion of the stanchion. Advantageously, in this configuration, if the user wishes to adjust the vertical height of the locking unit (so as enable secure engagement with the locking disk), the effort that must be expended to do so is reduced by the translation from rotational movement of a relatively small rotatable element (which is easier to effect) to vertical movement of the entire locking unit (which would otherwise require significantly more effect to effect).

The adjustment mechanism may comprise a movable collar located on either side of the mounting feature. In some cases, each collar may comprise a grip portion that can be engaged by a suitable tool. For example, this grip portion may be in the form of a hexagonal bolt head that may be easily gripped with jaws of a suitable spanner or wrench. Advantageously, the user is able to adjust each of the movable collars to move the locking unit in a particular direction (for example, rotation of a collar below the mounting feature may result in upwards movement of the locking unit within the mounting feature). In addition, ensuring that a portion of the collar may be easily gripped by a wrench or other tool operated by the user increases the ease of adjustment of the collar, preventing slipping of the tool on the collar and ensuring smooth adjustment of the locking unit position.

Optionally, the adjustment mechanism is electronically actuated. This advantageously allows smooth movement of the adjustment mechanism, particular in the case of very large and heavy wind turbine components.

Optionally, the rotor lock system may comprise at least two locking units arranged around the main rotor shaft. Advantageously, this configuration ensures that the loading from the main rotor shaft is equally distributed between the two locking units, effectively halving the forces exerted on a single locking unit and preventing shearing or uneven wear of a particular locking unit, or rocking of the main rotor shaft. In some cases, the locking units may be arranged on generally opposite sides of the main rotor shaft, allowing for even balancing of the loading and torque between the locking units.

In these cases, it may be advantageous to have similar locking units and mount them to move along substantially parallel axes.

According to another embodiment of the present invention, there is provided a nacelle of a wind turbine comprising the rotor lock system including any of the above-described features.

BRIEF DESCRIPTION OF THE DRAWINGS

One or more embodiments of the invention will now be described, by way of example only, with reference to the accompanying drawings, in which.

DETAILED DESCRIPTION

A specific embodiment of the present invention will now be described in which numerous specific features will be discussed in detail in order to provide a thorough understanding of the inventive concept as defined in the claims. However, it will be apparent to the skilled person that the invention may be put in to effect without the specific details and that in some instances, well known methods, techniques and structures have not been described in detail in order not to obscure the invention unnecessarily.

Figure 1:
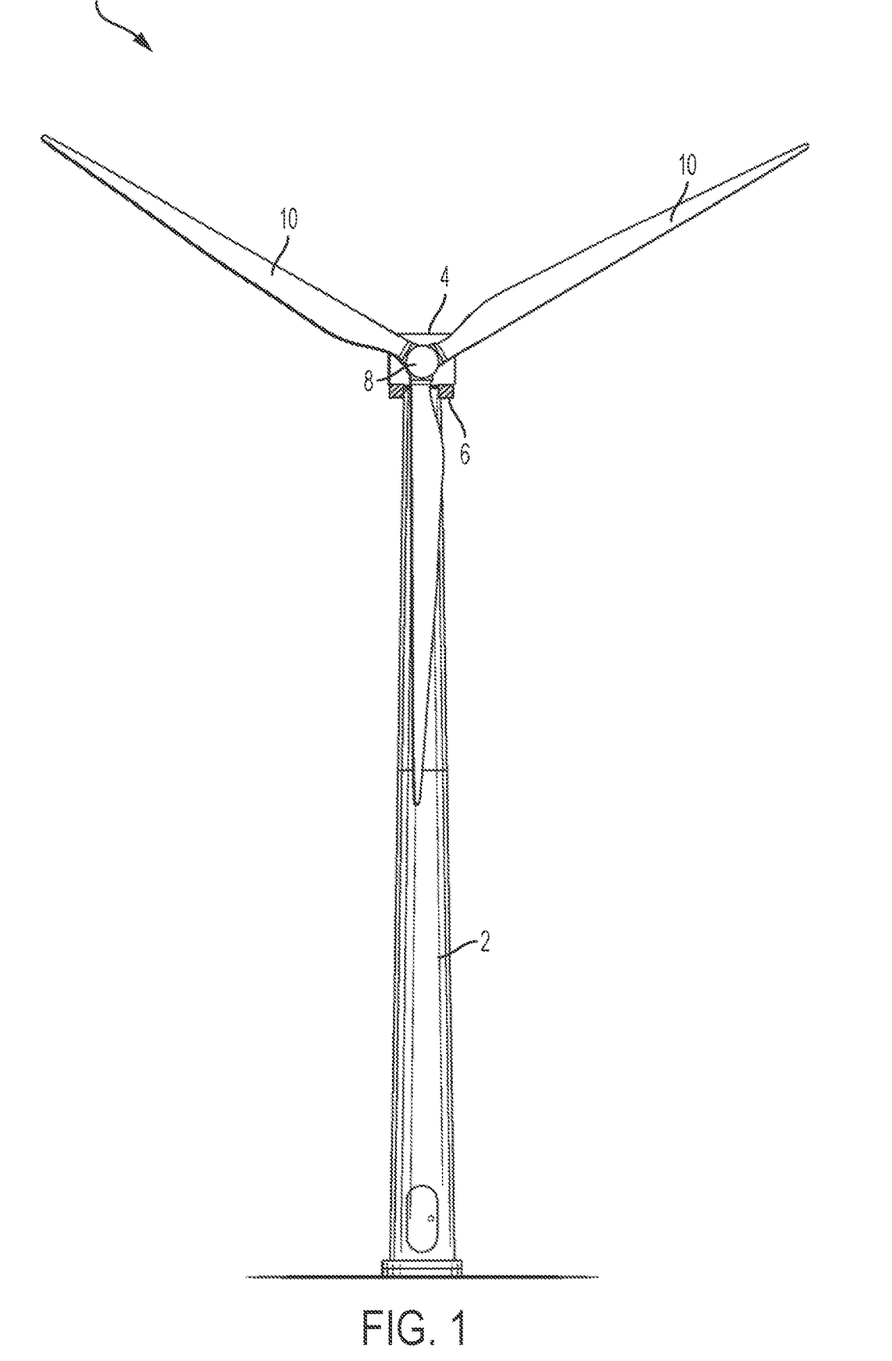
FIG. 1 shows a front view of a typical horizontal axis wind turbine in which a rotor lock system according to an embodiment of the present invention may be implemented.

In order to place the embodiments of the invention in a suitable context, reference will firstly be made to FIG. 1, which illustrates a typical Horizontal Axis Wind Turbine (HAWT) in which a rotor locking system according to an embodiment of the present invention may be implemented. Although this particular image depicts an on-shore wind turbine, it will be understood that equivalent features will also be found on off-shore wind turbines. In addition, although the wind turbines are referred to as 'horizontal axis', it will be appreciated by the skilled person that for practical purposes, the axis is usually slightly inclined to prevent contact between the rotor blades and the wind turbine tower in the event of strong winds.

The wind turbine 1 comprises a tower 2, a nacelle 4 rotatably coupled to the top of the tower 2 by a yaw system 6, a rotating hub 8 mounted to the nacelle 4 and a plurality of wind turbine rotor blades 10 coupled to the hub 8. The nacelle 4 and rotor blades 10 are turned and directed into the wind direction by the yaw system 6. The nacelle 4 houses all of the generating components of the wind turbine, including the generator, gearbox, drive train and brake assembly, as well as convertor equipment for converting the mechanical energy of the wind into electrical energy for provision to the grid. The nacelle 4 also necessarily contains a main shaft housing (not shown in FIG. 1), which houses a main rotor shaft that is connected at a forward end to the hub 8 and rotor blades 10, and at a rear end to the generating components.

Figure 2:
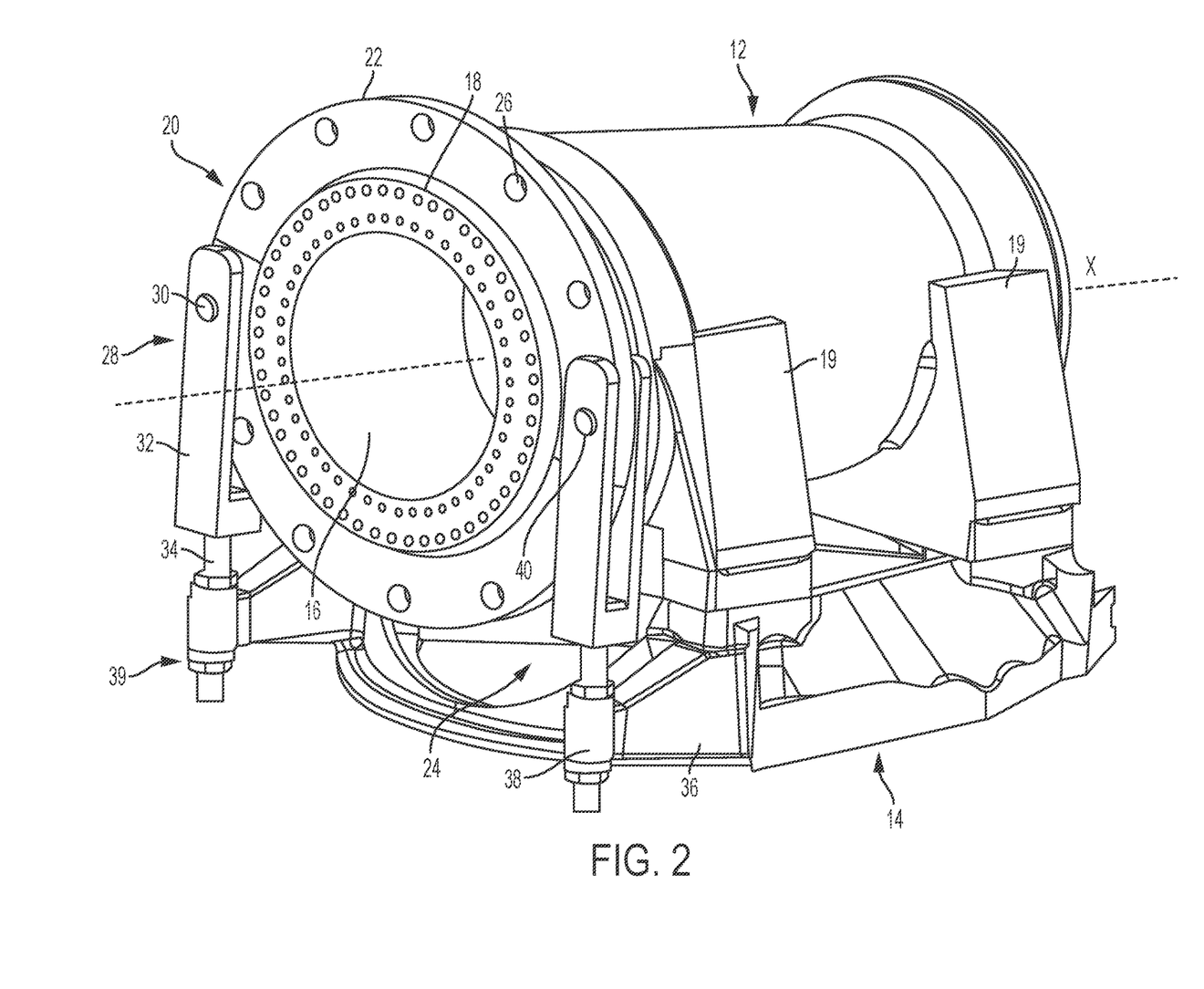
FIG. 2 is a perspective illustration of a portion of the wind turbine of FIG. 1, comprising a rotor lock system according to an embodiment of the present invention.

FIG. 2 shows a perspective view of a main shaft housing 12 of the wind turbine 1, in which the main shaft housing 12 is attached to a load-bearing base frame 14. The base frame provides support to the main shaft housing 12, transmitting the forces from the hub 8 and rotor blades 10 to the wind turbine tower 2. It should be appreciated that, for convenience, the main shaft housing 12 and base frame 14 are shown in isolation here without any of the other generating equipment attached to them.

The main shaft housing 12 rotatably supports a main rotor shaft 16 which is attached to the hub 8 by a hub mounting 18, for example by bolts passing through holes in the hub mounting 18, though it should be noted that the exact means for coupling the shaft to the hub are not shown here for clarity but would be known to the skilled person. The main shaft housing 12 also comprises a front bearing and a rear bearing (both not shown) which are suitable bearings, such as roller bearings, that enable the main rotor shaft 16 to rotate about a longitudinal 'rotor axis' Y. The main shaft housing 12 also comprises a plurality of supporting legs 19 via which the main shaft housing 12 is attached to the supporting base frame 14. The base frame 14 in turn comprises a mounting (not shown) on its underside for interfacing with the yaw system 6 provided in the tower 2.

A rotor lock system 20 according to an embodiment of the present invention is implemented on the main shaft housing 12 and base frame 14, and comprises an annular rotor locking disk 22 and first and second locking units 24. The rotor locking disk 22 encircles the main rotor shaft 16 and is located ahead of the main shaft housing 12 and directly behind the hub mounting 18. As used herein, the terms 'ahead', 'forward' and 'in front of' refer to a direction along the Y axis that lies proximal to the hub 8 and rotor blades 10;

similarly the terms 'behind' or 'rear' refer to a direction along the Y axis that lies distal from the hub 8.

In general terms, the function of the rotor lock system 20 is to engage with the main rotor shaft 16 so as to prevent rotational motion of the main rotor shaft 16 and its connected components, thereby holding these components in a substantially stationary state.

The main rotor shaft 16 is associated with a plurality of locking apertures 26 which are provided at intervals around the circumference of the rotor locking disk 22 in this embodiment. It is envisaged that the rotor locking disk 22 in this embodiment is cast as a separate component from the main rotor shaft 16, however this is not essential and the rotor locking disk 22 could be cast as an integral component with the main rotor shaft 16. It will also be appreciated that the rotor locking disk 22 need not necessarily be cast as a single component, and may instead be formed of multiple segments. These segments may be joined to one another (for example, by welding) to form a complete ring. Each locking unit 24 comprises a retaining member 28, arranged to be mounted on the base frame 14, and a moveable locking member 30. The retaining member 28 is configured to receive, retain or otherwise engage with a portion of the rotor locking disk 22. The locking member 30 is configured to engage with both the retaining member 28 and the rotor locking disk 22, to hold the rotor locking disk in place, and in this embodiment is provided in the form of a locking pin, bolt or screw. This prevents further substantial rotational motion of the main rotor shaft 16 and its connected components. Alternative forms that the locking member 30 may take will be described subsequently with reference to FIG. 5.

The retaining member 28 comprises a bracket or clamp 32 that is attached or otherwise coupled to a support stanchion, stem or bar 34. The support stanchion 34 may be a unitary cast component, or may comprise multiple components that are cast separately and are subsequently coupled or otherwise attached to one another. In use, the support stanchion 34 is mounted on the base frame 14 via a supporting arm 36 which, in the illustrated embodiment, projects outwardly and generally forwardly from the base frame 14, and terminates in a mounting feature such as a mounting boss 38 into which the support stanchion 34 is inserted. The supporting arm 36 therefore supports the retaining member 28 in a fixed position relative to the base frame 14 and, thus, also the rotor locking disk 22. The relative dimensions and orientation of the retaining member 28 and supporting arm 36 ensure that, when the retaining member 28 is mounted to the supporting arm 36, a portion of the rotor locking disk 22 is received within the bracket 32. The support stanchion 34 also comprises an adjustment mechanism 39 for varying the position of the retaining member 28 relative to the rotor locking disk 22 and thereby altering the portion of the rotor locking disk 22 that is received within the bracket 32.

The retaining member 28 is associated with at least one retaining hole or aperture 40. The retaining aperture 40 is provided in the bracket 32 and is arranged to receive a portion of the locking member 30. When the rotor lock system 20 is in use, the retaining aperture 40 and at least one of the locking apertures 26 are arranged to receive portions of the locking member 30 so as to enable engagement between the locking unit 24 and the rotor locking disk 22.

In the embodiment of FIG. 2, two locking units 24 are provided, one on either side of the main rotor shaft 16. This arrangement ensures that the torque exerted by the rotating main rotor shaft 16 and the associated loading is equally distributed between the two locking units 24, effectively halving the forces exerted on a single locking unit 24 and preventing shearing or uneven wear of a particular locking unit 24, or rocking of the main rotor shaft 16. However, it will be appreciated that this arrangement may be varied depending on the system requirements and the exact configuration of the locking units. Such design modifications are deemed to lie within the scope of the present invention.

The rotor lock system 20 will now be described in greater detail with reference to FIG. 3, which shows a perspective close-up view of the retaining member 28 on its own so that its configuration can be more easily appreciated.

The retaining member 28 comprises a pair of substantially vertical elongated plates or arms 42 that are arranged parallel to one another, and joined at their bases by a substantially horizontal bridge 44 to create a generally 'U'-shaped bracket 32. The arms 42 are spaced apart to define a gap 46 which is sized and configured to embrace or receive a portion of the rotor locking disk 22. The support stanchion 34 is attached or otherwise coupled to the bridge 44, giving the retaining member 28 an overall fork-like or caliper shape. It will be appreciated that this attachment between support stanchion 34 and bridge 44 need not be permanent, and the two components may be separated from one another should this be necessary. This may be particularly useful for the purposes of transportation, since the stanchion may be transported with the base frame 14, whereas the retaining member 28 may be transported with the main shaft housing 14 by virtue of being connected to the rotor locking disc. Usefully, therefore, the locking tool/unit does not have to be transported as a separate component, as parts of it may be connected to different, larger components of the wind turbine, that is the base frame and the main shaft housing. Moreover, the parts of the locking unit can be transported making sufficient use of space since none of the parts protrude beyond the outer envelope of the larger parts with which they are being transported.

It should be noted that the gap between the arms 42 is sized to maintain a sufficient clearance to allow for tolerances in manufacture of the rotor locking disk 22 so as to prevent the rotor locking disk 22 from impacting or clashing with the arms 42 as the rotor locking disk 22 rotates within the retaining member 28.

A retaining aperture 40 is provided in a distal end of each arm 42 of the retaining member 28, the retaining apertures 40 each horizontally penetrating the respective arm 42 and being aligned vertically with one another. The rotor locking disk 22 is configured such that a radial path of the locking apertures 26 passes through the retaining apertures 40. This therefore ensures that when the main rotor shaft 16 is brought to a standstill and the relevant portion of the rotor locking disk 22 is received within the retaining member, the retaining apertures 40 are vertically aligned with the locking aperture 26. The locking member 30 may then be passed through the three apertures. The engagement between the locking member 30, the retaining apertures 40 and the locking aperture 26 thereby prevents any further rotation of the main rotor shaft 16. Such secure engagement is particularly useful to ensure that the main rotor shaft 16 (and its connected components) is retained securely in a locked position during installation of the entire assembly on top of the wind turbine tower 2. It should be noted that the primary function of the locking unit 24 is to securely engage with and effectively 'lock onto' the rotor locking disk 22 to prevent further substantial rotation of the main rotor shaft 16. Alternative locking unit 24 designs which achieve the same function are described in detail subsequently with reference to FIGS. 4 and 5.

The adjustment mechanism 39 which is associated with the support stanchion 34 of the retaining member 28 will now be considered in further detail. This adjustment mechanism 39 comprises a linear adjuster which is arranged to perform the function of varying the position of the retaining member 28 with respect to the rotor locking disk 22. Possible configurations of the adjustment mechanism 39 that would be suitable for use with the present invention could include a linear electric actuator such as a lead screw, or a ratchet mechanism with complementary portions provided on the support stanchion 34 and the mounting boss 38.

Figure 3:
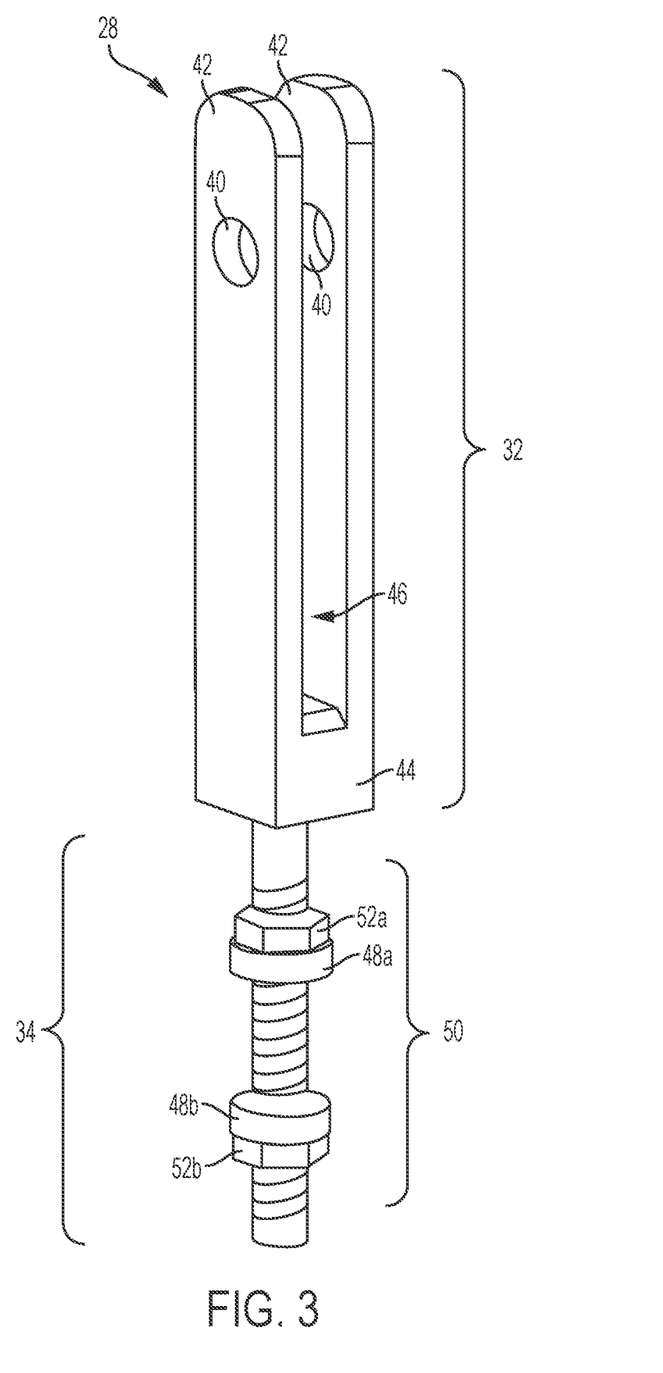
FIG. 3 is a diagram of a retaining member of the rotor lock system shown in FIG. 2.

However, in the illustrated embodiment of FIG. 3, the adjustment mechanism 39 comprises a pair of rotatably-adjustable collars 48a, 48b associated with an adjustment guide portion 50. The collars 48a, 48b are provided on a threaded guide portion 50 of the support stanchion 34, and arranged in use to effectively sandwich the mounting boss 38 between them. Specifically, when the support stanchion 34 is inserted into the mounting boss 38, one adjustment collar 48a is located immediately above the mounting boss 38 whilst the other collar 48b is located directly below the mounting boss 38. Each collar 48a, 48b bears against the mounting boss 38 so as to hold the retaining member 28 securely in a desired position.

Each adjustment collar 48a, 48b may comprise a grip portion 52a, 52b configured to make it easier for a user to adjust the collar using an appropriate tool. In the illustrated embodiment, grip portions 52a, 52b are in the form of a hexagonal bolt head, that is to say configured to have a series of opposed flat surfaces that may be gripped with jaws of a suitable tool such as a spanner or wrench. The grip portions 52a, 52b could also define other gripping surfaces such as knurling or splines. Note that in the illustrated embodiment, the remaining portions of the collars 48a, 48b which are directly adjacent the mounting boss 38 have generally smooth cylindrical outer surfaces which have a slightly greater diameter than that of the grip portions 52a, 52b. This helps to keep the gripping tool in place during collar adjustment and, in particular, guards against the risk that a gripping tool may slide down the collar so as to come into contact with the mounting boss 38.

Each collar 48a, 48b may also be associated with a washer or spacer (not shown), whereby each spacer is located in between its respective collar 48a, 48b, and the mounting boss 38. The spacers provide the additional benefit of reducing wear when the collars 48a, 48b are moved with respect to the mounting boss 38.

The collars 48a, 48b are rotatably moveable along the threaded guide portion 50 of the support stanchion 34 in order to adjust the position of the retaining member 28 relative to the mounting boss 38. For example, a wrench or other similar tool could be used to move the lower collar 48b upwards along the threaded guide portion 50, thereby causing the retaining member 28 to move upwards within the mounting boss 38. Moving the upper collar 48a downward along the threaded guide portion 50 would result in a downwards adjustment of the retaining member 28 within the mounting boss 38.

It will be appreciated that the locking member 30 could be inserted manually by service personnel; alternatively, a powered actuator, for example a hydraulic actuator, could be provided to push the locking member 30 through the locking apertures 26 in the rotor locking disk 22 so as to avoid the need for personnel to be present to interact with the equipment. In practice, it is envisaged that the locking member 30 could be actuated whilst the rotor is turning slowly so that the locking member would engage the apertures automatically when in suitable alignment. In addition, after the locking member 30 is positioned within the retaining and locking apertures 26, 40, the retaining member 28 can be moved axially downwards such that the locking member 30 bears against the base of the locking aperture 26. When the locking units 24 on either side of the main rotor shaft 16 are adjusted in this manner, equal downward forces are exerted by the locking member 30 on the locking apertures 26 of the rotor locking disk 22. This ensures that the rotor locking disk 22 is held securely in position and prevents any unwanted rotation or rocking of the rotor locking disk 22 or main rotor shaft 16.

Many modifications may be made to the above embodiments and examples without departing from the scope of the present invention as defined in the accompanying claims.

Figure 4:
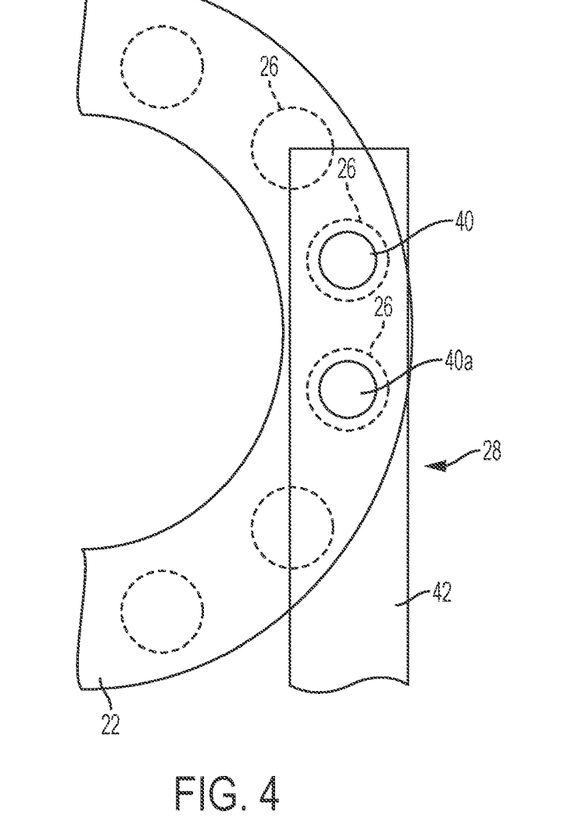
FIG. 4 is a schematic view of a portion of a locking unit in accordance with another embodiment of the present invention.

For example, a locking unit according to an alternative embodiment of the present invention may be seen in FIG. 4, which shows a portion of the rotor locking disk 22 and a retaining member 28. In this embodiment, an additional retaining aperture 40a may be provided in each arm 42 of the retaining member 28, thereby providing two pairs of retaining apertures 40, 40a per retaining member 28. In this embodiment, the vertical position of the retaining member 28 may be adjusted to ensure that the portion of the rotor locking disk 22 received by the retaining member 28 is associated with at least two locking apertures 26, each locking aperture 26 being vertically aligned with one pair of retaining apertures 40, 40a. Additional locking members 30 would also be provided in such embodiments, each locking member 30 engaging with a locking aperture 26 and a corresponding retaining aperture pair 40 as described previously. Such embodiments increase the number of points of engagement of the locking units 24 with the rotor locking disk 22 and thereby provide a more secure locking effect.

It will be appreciated that although the exact location of the points of engagement between the locking units 24 and the rotor locking disk 22 may vary in different embodiments, the points of engagement are provided on generally opposite sides of the main rotor shaft 16, to ensure equal distribution of the loading between the two engagement points. For example, in the embodiment of FIG. 2 in which only a single retaining aperture 40 is provided in each locking unit 24, the engagement points of the locking units 24 with the rotor locking disk 22 are located at diametrically opposite points across the diameter of the rotor locking disk 22. In other words, the engagement points are provided at the "9 o'clock" and "3 o'clock" positions on the face of the rotor locking disk 22 (when it is viewed from the front). If the embodiment of FIG. 5, featuring multiple retaining apertures 40, 40a in each locking unit 24, were to be implemented, the points of engagement between each locking unit 24 and the rotor locking disk 22 would be located between the "8 and 10 o'clock positions" and between the "2 and 4 o'clock" positions on the face of the rotor locking disk 22.

Figure 5:
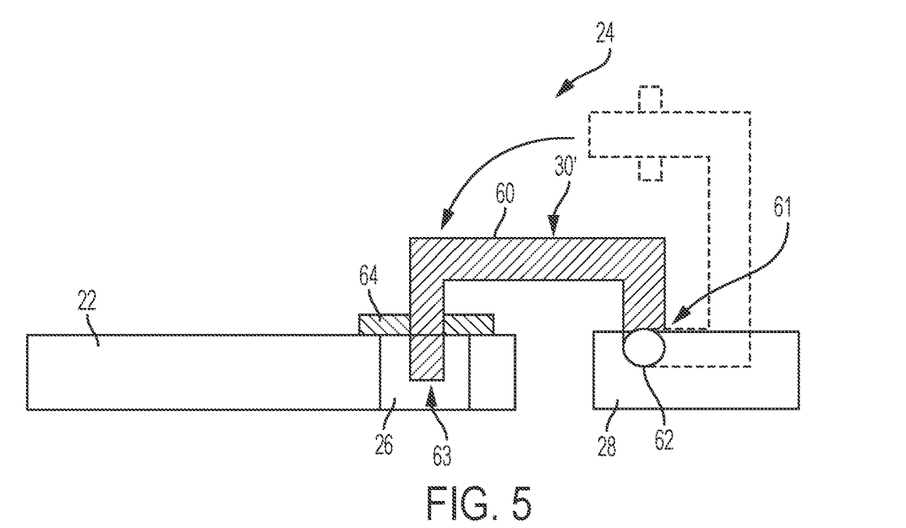
FIG. 5 is a schematic view of a portion of a locking unit in accordance with another embodiment of the present invention.

In another example, FIG. 5 illustrates a portion of a locking unit 24 and rotor locking disk 22 according to an alternative embodiment of the present invention. Note that the same numbering as used in previous embodiments will be used to refer to same or similar parts. The locking unit 24 comprises a locking member 30' that is configured to be coupled to, and rotatably movable with respect to, the retaining member 28. Unlike the simple locking pin of FIG. 2, the locking member 30' of FIG. 5 comprises a generally 'U' shaped clamp 60, which is coupled to the retaining member 28 at a first end 61 via a hinge 62 (or other suitable means) thereby allowing the clamp 60 to pivot towards and away from the rotor locking disk 22. A second end 63 of the clamp 60 is sized and arranged to be extendable into one of the locking apertures 26. A flange 64 is provided adjacent to the second end 63 of the clamp 60, the flange 64 having a diameter greater than that of the locking apertures 26. When the rotor lock system 20 is in use, the clamp 60 is rotated about the hinge 62 towards the rotor locking disk 22 such that the second end 63 enters a locking aperture 26. The locking unit 24 thereby engages with the rotor locking disk 22. The rotation of the clamp 60 brings flange 64 flush with the back of the rotor locking disk 22, thereby preventing any further forward motion of the second end 63 through the locking aperture 26, and ensuring secure engagement between the locking unit 24 and the rotor locking disk 22.

It will be appreciated by those skilled in the art that the invention has been described by way of example only, and that a variety of alternative approaches may be adopted without departing from the scope of the invention, as defined by the appended claims.

The invention claimed is:

1. A rotor lock system for securing a main shaft assembly of a wind turbine in a substantially stationary position, the main shaft assembly comprising a main rotor shaft supported by a base frame and rotatable about a longitudinal axis relative to the base frame, and the rotor lock system comprising:
   a locking disk associated with the main rotor shaft and provided with a plurality of locking apertures, each of the plurality of locking apertures extending through the locking disk in a direction substantially parallel to the longitudinal axis; and
   a locking unit comprising a first end arranged to engage with one or more of said plurality of locking apertures and a second end supported by a mounting feature associated with the base frame,
   wherein when the first end of the locking unit is disengaged from the one or more of said plurality of locking apertures, the locking unit is adjustable relative to the mounting feature so that the first end moves linearly with respect to the mounting feature, and
   wherein when the first end of the locking unit is engaged with the one or more of said plurality of locking apertures, the locking unit is incapable of being adjusted relative to the mounting feature and the locking disk is incapable of rotating about the longitudinal axis.

2. The rotor lock system of claim 1, wherein the first end of the locking unit comprises a retaining member for retaining at least a portion of the locking disk.

3. The rotor lock system of claim 2, wherein the retaining member comprises one or more arms located adjacent to the locking disk.

4. The rotor lock system of claim 2, wherein the locking unit further comprises a locking member moveable relative to the retaining member so as to releasably lock the locking disk into a fixed position.

5. The rotor lock system of claim 4, wherein the retaining member is provided with one or more horizontally-penetrating retaining apertures, and wherein the locking member is configured to engage with the retaining apertures and at least one of the plurality of locking apertures in the locking disk.

6. The rotor lock system of claim 1, wherein the second end of the locking unit comprises a stanchion configured to be mounted to the mounting feature.

7. The rotor lock system of claim 6, wherein the stanchion comprises an adjustment mechanism arranged to enable the stanchion to be moved along a linear axis with respect to the mounting feature.

8. The rotor lock system of claim 7, wherein the adjustment mechanism comprises at least one rotatable element, and wherein the adjustment mechanism is arranged to convert rotational movement of the at least one rotatable element to axial movement of the locking unit.

9. The rotor lock system of claim 7, wherein the adjustment mechanism comprises a movable collar located on either side of the mounting feature.

10. The rotor lock system of claim 9, wherein the movable collar comprises a grip portion that can be engaged by a suitable tool.

11. The rotor lock system of claim 7, wherein the adjustment mechanism is electronically actuated.

12. The rotor lock system of claim 8, wherein the at least one rotatable element comprises a collar movable along a threaded portion of the stanchion.

13. The rotor lock system of claim 1, comprising at least two locking units arranged around the main rotor shaft.

14. The rotor lock system of claim 13, wherein the at least two locking units are arranged on generally opposite sides of the main rotor shaft.

15. The rotor lock system of claim 13, wherein the at least two locking units are substantially identical.

16. The rotor lock system of claim 13, wherein the at least two locking units are configured to be adjustable relative to the mounting feature so that the first ends move linearly and along substantially parallel axes.

17. The rotor lock system of claim 1, wherein said mounting feature is an integral part of said base frame.

18. A nacelle of a wind turbine comprising the rotor lock system according to claim 1.

19. The rotor lock system of claim 1, wherein the second end of the locking unit is configured to be supported by the mounting feature at a position below the locking disk.

20. The rotor lock system of claim 1, further comprising a locking member moveable relative to the locking unit to releasably lock the locking disk into a fixed position, wherein the first end of the locking unit is moveable in a first direction and the locking member is moveable in a second direction, and wherein the first and second directions are different from each other.

* * * * *